United States Patent [19]
Yoshida et al.

[11] Patent Number: 5,813,011
[45] Date of Patent: Sep. 22, 1998

[54] STORAGE OF A COMPRESSED FILE CONTAINING ITS OWN COMPRESSION MANAGEMENT TABLE

[75] Inventors: Shigeru Yoshida; Masanaga Tokuyo; Yoshiyuki Okada, all of Kawasaki, Japan

[73] Assignee: Fujitsu Limited, Kanagawa, Japan

[21] Appl. No.: 644,158

[22] Filed: May 10, 1996

[30] Foreign Application Priority Data

May 12, 1995 [JP] Japan .................................. 7-114500

[51] Int. Cl.$^6$ ............................................. G06F 12/00
[52] U.S. Cl. ........................................ 707/101; 707/205
[58] Field of Search ................................ 395/612, 621; 707/101, 205

[56] References Cited

U.S. PATENT DOCUMENTS

| | | | |
|---|---|---|---|
| 5,087,913 | 2/1992 | Eastman | 341/95 |
| 5,124,987 | 6/1992 | Milligan et al. | 395/182.05 |
| 5,193,184 | 3/1993 | Belsan et al. | 395/404 |
| 5,237,460 | 8/1993 | Miller et al. | 360/8 |
| 5,237,675 | 8/1993 | Hannon, Jr. | 395/888 |
| 5,463,772 | 10/1995 | Thompson et al. | 395/612 |
| 5,481,701 | 1/1996 | Chanbers, IV | 707/101 |
| 5,488,365 | 1/1996 | Seroussi et al. | 341/51 |

OTHER PUBLICATIONS

"A Universal Compressed Data Format for Foreign File Systems", Kawashima et al, *IEEE Data Compression Conference*, 1995, p. 429.

*Primary Examiner*—Wayne Amsbury
*Attorney, Agent, or Firm*—Nikaido, Marmelstein, Murray & Oram LLP

[57] ABSTRACT

A compressed file consists of: a header that carries information showing the position of a compression management table; compressed codes; and the compression management table that holds information showing the storage location of the compressed code of each original record. In a preferred mode, compression and decompression of data and access to compressed data are performed using input/output functions within an input/output function library so that the user need not be aware of the compression and decompression operations and the storage location of compressed data. In a further preferred mode, with these input/output functions it is judged whether a file being accessed is a compressed file or not, and if it is a compressed file, the operation is switched to input/output functions for a compressed file.

54 Claims, 20 Drawing Sheets

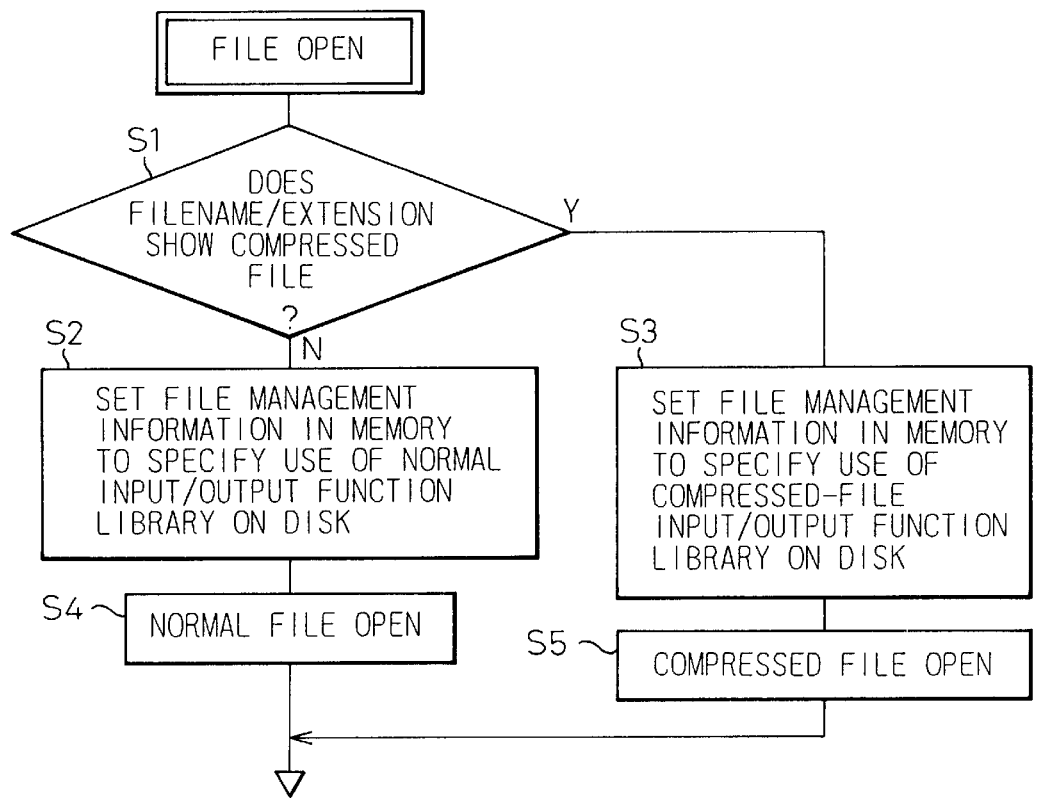
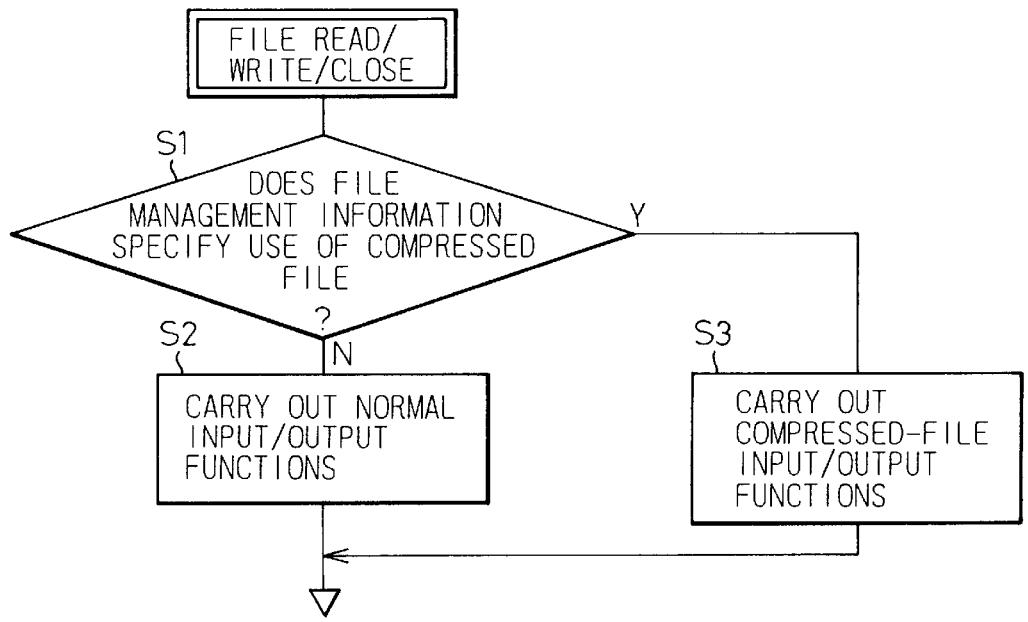

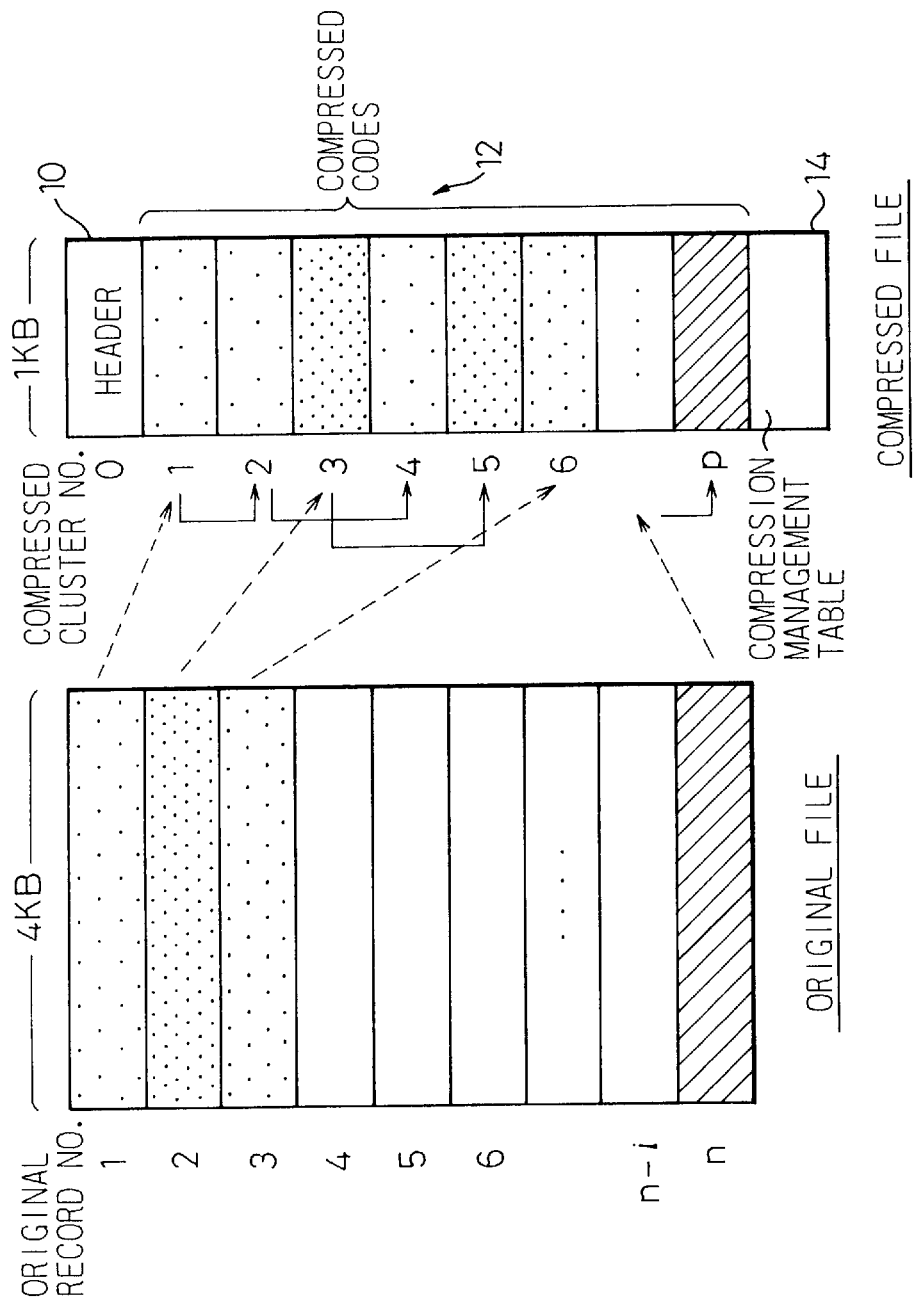

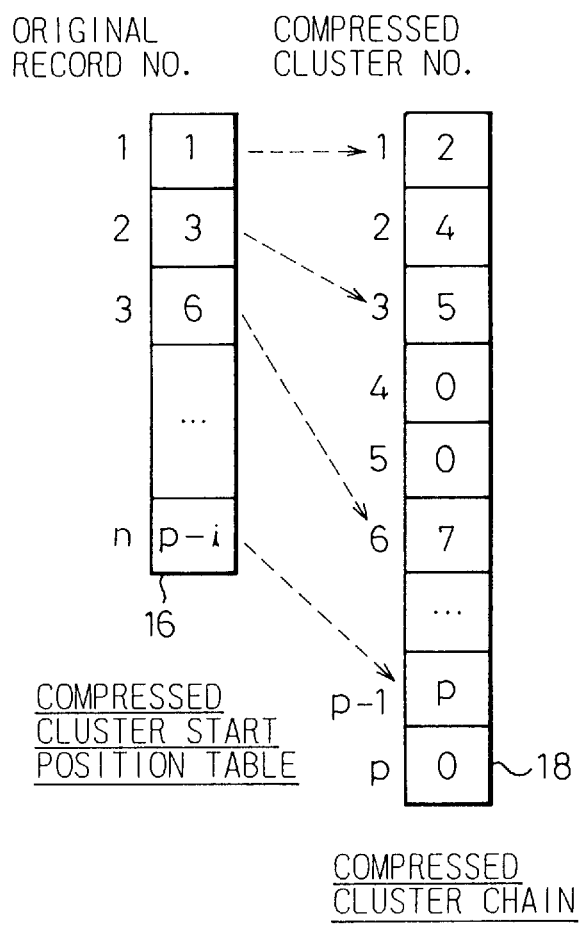

| COMPRESSION MANAGEMENT TABLE | | | |
|---|---|---|---|
| ORIGINAL RECORD NO. | COMPRESSED RECORD NO. | STARTING CLUSTER IN COMPRESSED RECORD | CLUSTER LENGTH |
| 1 2 ⋮ n | | | |

34

STORAGE OF A COMPRESSED FILE CONTAINING ITS OWN COMPRESSION MANAGEMENT TABLE

BACKGROUND OF THE INVENTION

1. Field of the Invention

The present invention relates to a method and apparatus for storing compressed data and to a storage medium for storing a program used when storing compressed data.

2. Description of the Related Art

In recent years, various types of data, such as character codes, vector information, and image information, have come to be handled by computers and the like, and with this trend, the amount of data being handled has been increasing rapidly. When handling a large amount of data, it has been practiced to compress the amount of data by eliminating redundancies in the data, thereby reducing the required storage space or increasing data transmission speeds.

Universal coding has previously been proposed as a method that can compress various types of data by using one coding scheme, and various kinds of utility software have been commercialized by utilizing the feature of the universal coding that it can compress any type of data. Such disk compression utilities provide the function of compressing a disk to double its storage capacity and making it possible to use the compressed disk like an uncompressed disk without making the user aware of the disk compression function.

There have been used two major methods for storing compressed files, as will be described below.

The first method stores compressed data sequentially into a file, starting from the head of the file, and reads sequentially from the head of the file when restoring the original data. With this method, as it is designed to implement compression/decompression algorithms on the application program side, compressed files containing compressed data and normal files containing uncompressed data can be treated at the same level when viewed from the operating system, so that both types of files can be stored on the same disk. It is also possible to store compressed files created by different compression algorithms on the same disk. Therefore, different files containing different kinds of data, such as image data, voice data, and text data, compressed by different compression algorithms, can be stored on the same storage medium.

However, since this method is based on sequential compression/decompression of a whole file, the entire compressed file must be decompressed to create a normal file before a user program can access the file. When the user program has updated the contents of the file, before closing the user program a procedure has to be followed to compress the altered contents of the normal file, store the resulting compressed file, and then delete the normal file. This presents the problem that the user has to wait when starting and closing the user program since the procedure takes considerable time. Since the processing speed by software is at present about 100 KB/sec., this method is not suitable for handling files whose size is several hundred kilobytes or larger. There is the further problem that a work space for temporarily storing the normal file is required.

The second method locates a virtual drive dedicated to compressed files in front of one of a plurality of real drives (a plurality of real drives may be implemented on a single disk), and automatically compresses all files written to the virtual drive and stores them on a real drive in accordance with a prescribed storing scheme. Compressed files can be accessed randomly by reference to a mapping table intervening between the virtual drive and the real drive.

Relatively efficient file systems for mapping a virtual drive to a real drive include the LFS (Log Structured File System) (U.S. Pat. No. 5,124,987 and U.S. Pat. No. 5,193,184), which stores compressed data created from a single record into a plurality of clusters and packs the data on a cluster basis onto a real storage medium, and the PFS (Packed File System) (U.S. Ser. No. 07/556,772), proposed by the present inventor, which packs compressed data created from a plurality of records into one segment and stores the data onto a real storage medium on a segment basis. Access to compressed files using a mapping table and compression and decompression of data are performed by an I/O driver specially created for a virtual drive; therefore, compressed files and normal files appear the same to the user program, the only difference being that they are stored on different drives.

Since a compressed file can be accessed randomly without restoring the whole file, this method has the advantage that large overhead is not required when opening and closing a user program. In this method, however, read/write operations to a compressed file must always be performed via a specially customized I/O driver; in other words, the compressed file is tightly linked to the I/O driver within the operating system. Therefore, it is not desirable to create a virtual drive for compressed files on a removable medium such as a floppy disk. Furthermore, since a compressed file is always retrieved in a decompressed form, when used as a network drive the data transmission rate cannot be reduced unless the retrieved data is compressed once again. Moreover, since all compressed files are centrally managed in one location by using a mapping table, there is a danger that, if a fault occurs in that location, all the files on the virtual drive may become unretrievable.

SUMMARY OF THE INVENTION

In view of the above-outlined problems, it is an object of the present invention to provide means that combines the strengths of the above two prior art methods of compressed data storage, while overcoming the shortcomings of the respective methods.

According to the present invention, there is provided a method to be carried out by the operation of a computer comprising the steps of: (a) by referring to a compression management table which is stored in a file together with compressed data and which keeps records of where in the file compressed data of each original record is stored, determining the storage location in the file of compressed data of a desired original record, the file being implemented by an operating system; and (b) restoring the desired original record from the compressed data whose storage location is determined in step (a).

According to the present invention, there is also provided a method to be carried out by the operation of a computer comprising the steps of: (a) compressing an original record and thereby generating compressed data of the original record; and (b) storing the compressed data generated in step (a) into a file implemented by an operating system, the file containing compressed data of each original record and a compression management table that keeps records of where in the file compressed data of each original record is stored.

According to the present invention, there is also provided a compressed data storage device comprising: means for, by referring to a compression management table which is stored in a file together with compressed data and which keeps records of where in the file compressed data of each original record is stored, determining the storage location in the file of compressed data of a desired original record, the file being implemented by an operating system; and means for restoring the desired original record from the compressed data whose storage location is determined by the determining means.

According to the present invention, there is also provided a compressed data storage device comprising: means for compressing an original record and thereby generating compressed data of the original record; and means for storing the compressed data generated by the generating means into a file implemented by an operating system, the file containing compressed data of each original record and a compression management table that keeps a record of where in the file the compressed data of each original record is stored.

According to the present invention, there is also provided a program storage device readable by a machine, tangibly embodying a program of instructions executable by the machine to perform method steps for reading compressed data, said method steps comprising: (a) by referring to a compression management table which is stored in a file together with compressed data and which keeps a record of where in the file the compressed data of each original record is stored, determining the storage location in the file of compressed data of a desired original record, the file being implemented by an operating system; and (b) restoring the desired original record from the compressed data whose storage location is determined in step (a).

According to the present invention, there is also provided a program storage device readable by a machine, tangibly embodying a program of instructions executable by the machine to perform method steps for reading compressed data, said method steps comprising: (a) compressing an original record and thereby generating compressed data of the original record; and (b) storing the compressed data generated in step (a) into a file implemented by an operating system, the file containing compressed data of each original record and a compression management table that keeps a record of where in the file the compressed data of each original record is stored.

BRIEF DESCRIPTION OF THE DRAWINGS

FIG. 1 is a flowchart illustrating a file open process according to the present invention;

FIG. 2 is a flowchart illustrating a file read/write/close process according to the present invention;

FIG. 3 is a diagram for explaining one embodiment of the present invention in which the LFS method is adopted;

FIG. 4 is a diagram for explaining the compression management table shown in FIG. 3;

DESCRIPTION OF THE PREFERRED EMBODIMENTS

Figure 5:
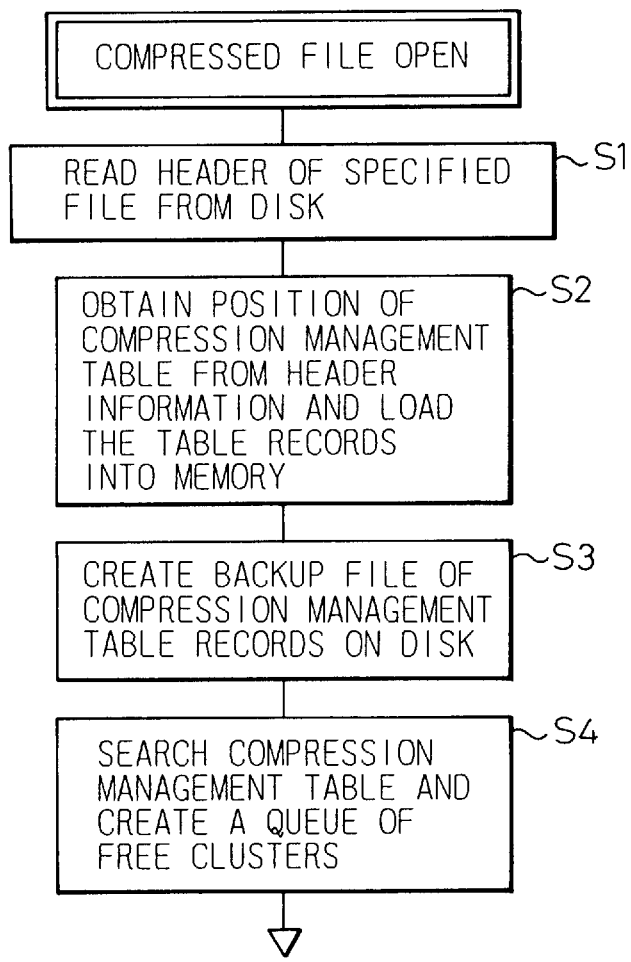
FIG. 5 is a flowchart illustrating a compressed file open process according to the embodiment of FIG. 3.

In the previously described second method for storing compressed data, since a mapping table exists between a virtual drive and a real drive unit to enable compressed files to be accessed randomly, a special I/O driver for accessing the compressed files has to be provided. By contrast, in the present invention, a compression management table as a mapping table is stored in a file organized by the operating system, together with compressed data, on a file-by-file basis, as will be described, in detail, later by way of example. An application program can randomly access compressed data in a file by referring to the mapping table stored in that file. Further, since compressed files and normal files can be handled at the same level by the operating system, compressed files and normal files can be stored on the same drive. In this case, it is desirable to design so that the efficient storing of compressed data and the compression and decompression of data being performed by the application program are invisible to the user. It is therefore desirable that these operations be carried out by input/output functions, such as "cget" and "cput" (in the case of the C language), selected from an input/output function library and automatically embedded into an object program. It is also desirable to design so that the input/output functions can identify each file as a normal file or compressed file on the basis of the file name, the extension of the file name, or the first record in the file, etc., and that if it is identified as a compressed file, input/output operations for a compressed file are carried out instead of input/output operations for a normal file.

FIGS. 1 and 2 are flowcharts illustrating the processing accomplished by the input/output functions according to the present invention implementing the above operations. FIG. 1 is a flowchart illustrating a file open process, and FIG. 2 is a flowchart illustrating a file read/write/close process.

In step S1 in FIG. 1, a file is identified as a normal file or a compressed file on the basis of the file name, the extension of the file, or the first record in the file, etc. For example, a convention should be adopted that if the file name begins with a special character "@", or if the file name has a special extension "xxx.cmp", then the file is identified as a compressed file. If the file is identified as a normal file, then in S2 file management information in memory is so set as to indicate that the file is a normal file. Next, in S4, a normal file open operation is carried out. On the other hand, if the file is identified as a compressed file, the process proceeds to S3 where the file management information in memory is so set as to indicate that the file is a compressed file. Then, in S5, a compressed file open operation (to be described later) is carried out.

Referring to FIG. 2, first, in S1, the file management information in memory is examined to determine if the file being accessed is a normal file or a compressed file. If the file is a normal file, then in S2 a normal file input/output operation (either a read, write, or close operation) specified by a host application program is carried out. On the other hand, if the file is a compressed file, the process proceeds to S3 where a compressed file input/output operation specified by the host application program is carried out. The input/output operations on a compressed file will be described in detail later.

As is well known, an input/output function library containing these input/output functions, an application program in which necessary input/output functions selected from the input/output function library are embedded, and an application program containing these input/output functions can be delivered on a suitable storage medium such as a floppy disk or a CD-ROM.

FIG. 3 is a diagram for explaining a compressed file storage method where the concept of the previously described LFS is applied to the compressed file structure. The present embodiment deals with an example in which uncompressed data is segmented into records of 4-KB size and the cluster size of compressed data is set to 1 KB. As shown in FIG. 3, a compressed file consists of three areas, i.e., a header 10, compressed codes 12 of original records, and a compression management table 14.

In the example shown in FIG. 3, the compressed record corresponding to the record at original record number 1 is stored in compressed clusters of compressed cluster numbers 1, 2, and 4, the compressed record corresponding to the original record at original record number 2 is stored in compressed clusters of compressed cluster numbers 3 and 5, and the compressed record corresponding to the original record at original record number 3 is stored in a compressed cluster of compressed cluster number 6.

The header 10 contains information about the original record length, the number of original records, and the number of compressed clusters. From this information, the position and length of the compression management table 14 placed at the end of the file can be determined. The compression management table 14 is placed at the end of the file because the table length may change when the contents of the file is updated; if the table were placed between the header 10 and the compressed codes 12, for example, the entire area of the compressed codes 12 would have to be moved when the length of the compression management table 14 is changed. The compression management table 14 contains a compressed code start position table (compressed cluster start position table) 16 and a compressed cluster chain 18, as shown in FIG. 4. The compressed code start position table 16 stores the start position of compressed clusters corresponding to each original record number with the original record number as an address. For example, the table shows that the start position of the compressed clusters holding the compressed record corresponding to the original record at original record number 1 is the compressed cluster of compressed cluster number 1. On the other hand, the compressed cluster chain 18 stores the subsequent cluster number of each cluster with the compressed cluster number as an address. That is, when compressed data of an original record is stored in multiple clusters, each subsequent cluster number is addressed by its preceding cluster number. For example, it is shown here that the compressed data corresponding to the original record at original record number 1 is stored first in compressed cluster 1, then in compressed cluster 2, and so on. If compressed data of an original record ends at a particular cluster, a 0 is written at the position of that particular cluster number in the compressed cluster chain. The compressed code of an original record is stored in one to four clusters. In the case of a record requiring four clusters for storage, raw data (uncompressed data) is stored.

FIGS. 5 to 8 are flowcharts illustrating input/output operations performed on a compressed file to which the concept of the LFS method is applied. FIG. 5 is a flowchart illustrating a compressed file open process, FIG. 6 a compressed file read process, FIG. 7 a compressed file write process, and FIG. 8 a compressed file close process. It is desirable to design the program so that these processes will be called from the input/output functions described with reference to FIGS. 1 and 2.

In FIG. 5, when the compressed file open process is called, the header of the compressed file corresponding to the specified file is read from the compressed file in S1. Next, in S2, the record length of the original file and the number of records contained therein are read from the header; based on the thus readout data, the position and record length of the compression management table stored in the compressed file are obtained, and the compression management table is loaded into memory. In S3, a backup file of the compression management table is created on the disk. This is done to enable the original data to be restored as much as possible in case an unexpected accident, such as a power failure, occurs during file updating. Next, in S4, the cluster chain in the compression management table is referenced to search for free clusters, and the free-cluster numbers are placed in a queue which is a linear list.

Figure 6:
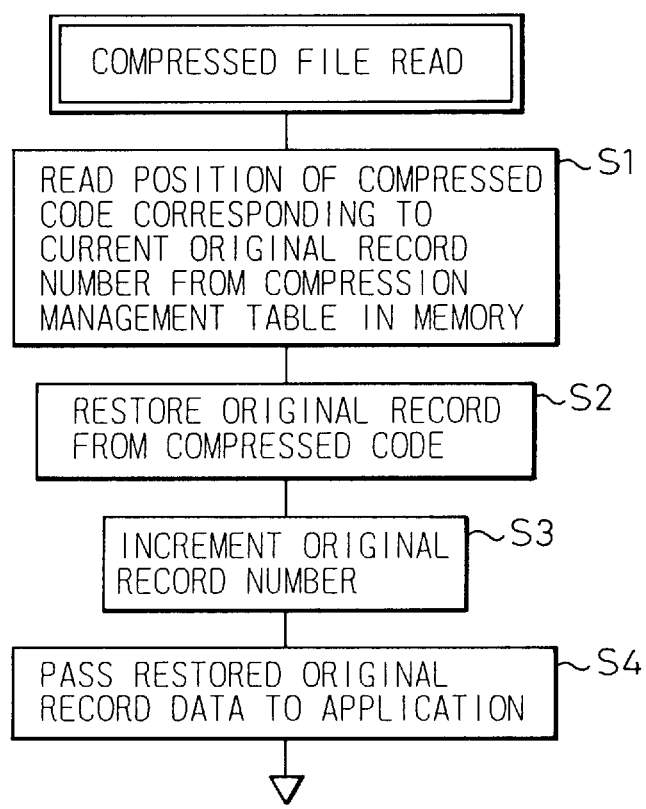
FIG. 6 is a flowchart illustrating a compressed file read process according to the embodiment of FIG. 3.

The compressed file read process will be described next with reference to FIG. 6. When the compressed file read process is called, first, in S1, the start position of the compressed code corresponding to the current original record number is read from the compressed cluster start position table 16 in the compression management table 14 loaded in memory. Then, from the thus readout compressed code start position, the compressed code of the original record is read onto the disk in accordance with the cluster chain 18. Next, in S2, the original record is restored from the retrieved compressed code and, in S3, the original record number is incremented by 1. In this way, when the compressed file read process is called next time, the next original record is accessed, unless a compressed record positioning seek process (to be described later) is called to set the original record number. Finally, in S4, the restored original record is passed to the host application program, upon which the process is terminated.

Figure 7:
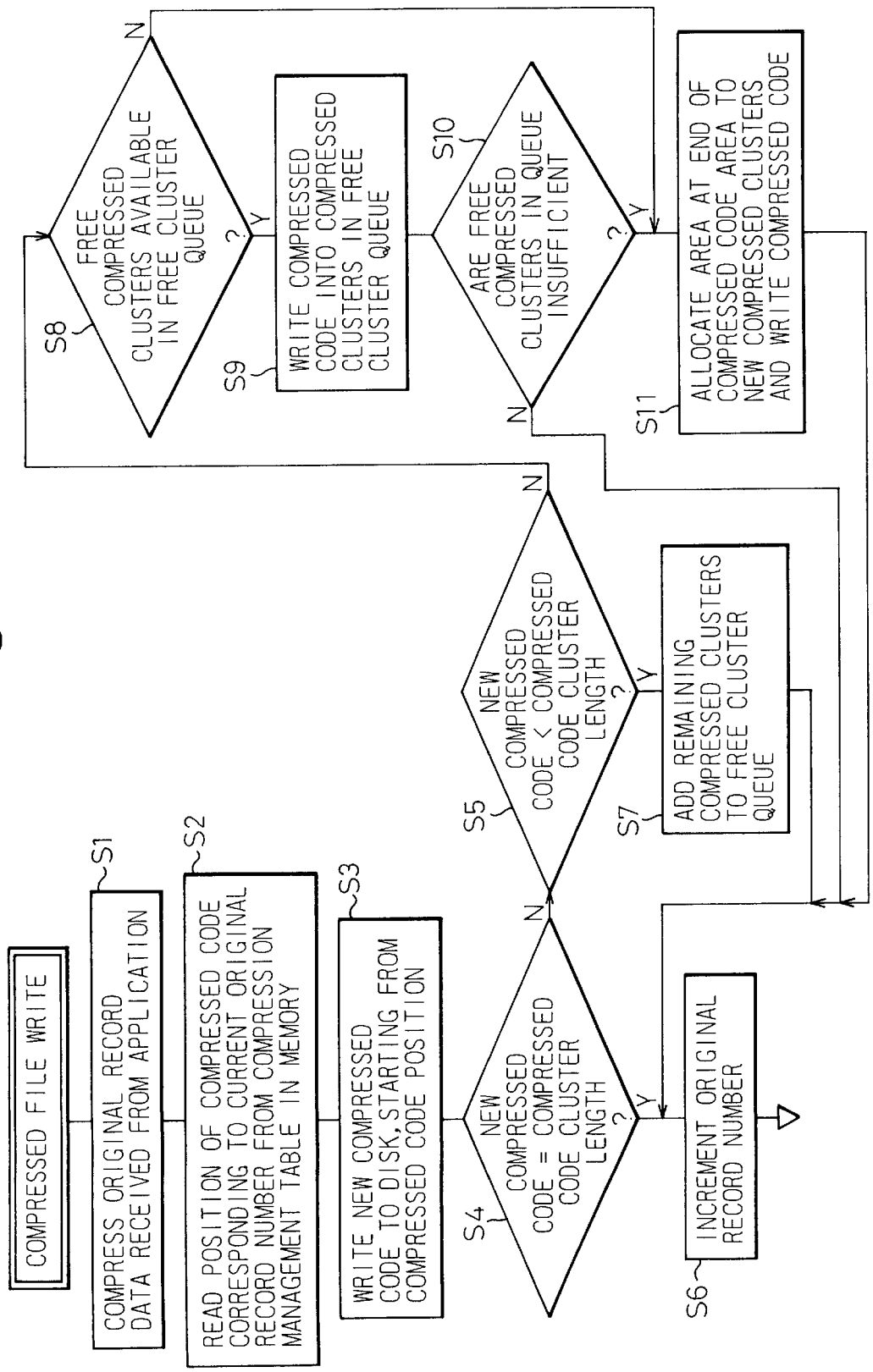
FIG. 7 is a flowchart illustrating a compressed file write process according to the embodiment of FIG. 3.

The compressed file write process will be described below with reference to FIG. 7. When the compressed file write process is called, first in S1 original record data received from the host application program is compressed. Next, in S2, the cluster start position corresponding to the current original record number is read from the compressed cluster start position table in the compression management table loaded in memory. Then, in S3, the compressed data of the original record is written to the disk, starting from the cluster start position read from the compressed cluster start position table, while referring to the cluster chain table. Next, in S4, it is determined whether the newly compressed code data is equal in cluster length to the original compressed code. If the newly compressed code data is equal in cluster length to the original compressed code, then in S6 the original record number is incremented by 1, after which the process is terminated. In this way, when the compression file write process is called next time, the next original record is accessed, unless the compressed record positioning seek process is called. On the other hand, if it is determined in S4 that the newly compressed code data is not equal in cluster length to the original compressed code, then it is determined in S5 whether the newly compressed code data is smaller in cluster length than the original compressed code. If the newly compressed code data is smaller in cluster length than the original compressed code, 0 is written to the final cluster position in the cluster chain table, and the remaining free clusters are placed in a queue, after which the process proceeds to S6. On the other hand, if it is determined in S5 that the newly compressed code data is larger in cluster length than the original compressed code, then it is determined in S8 whether free clusters are available in the queue. If available, free clusters are dequeued one by one and the compressed code is written into the dequeued clusters. Linking relationships between these clusters are then recorded in the cluster chain table. Next, in S10, it is determined whether the available free clusters are insufficient for storing the compressed code. If not insufficient, the process proceeds to S6, after which the process is terminated. On the other hand, if, in S8, it is determined that free clusters are not available in the queue, or if, in S10, it is determined that the available free clusters are insufficient, then in S11 new clusters are allocated following the end of the compressed code area and the cluster chain table is updated accordingly, after which the compressed code is written to the new clusters.

Figure 8:
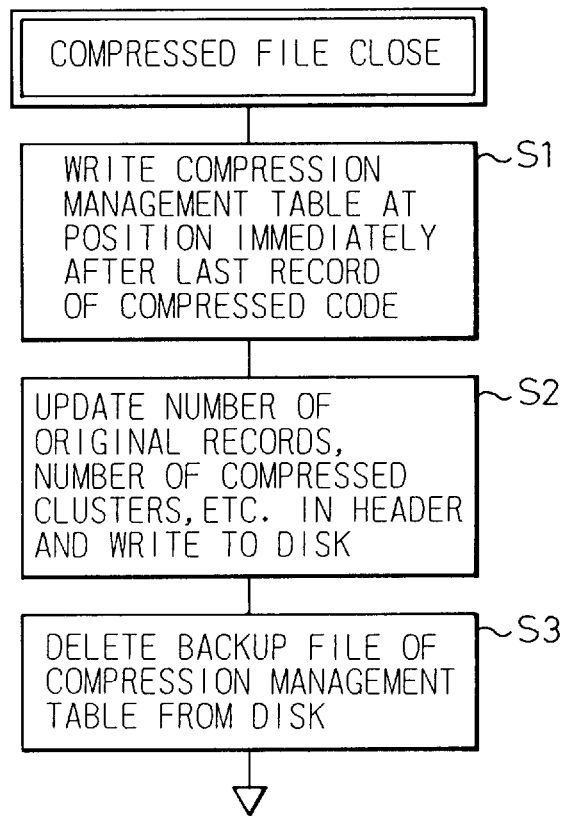
FIG. 8 is a flowchart illustrating a compressed file close process according to the embodiment of FIG. 3.

Next, the compressed file close process will be described with reference to FIG. 8. When the compressed file close process is called, in S1 the compression management table is written to the disk at a position immediately following the last record of the compressed code. Next, in S2, the number of original records and the number of compressed clusters, contained in the header, are updated and written to the disk. Next, in S3, the backup file of the compression management table is deleted from the disk, after which the process is terminated.

Figure 9:
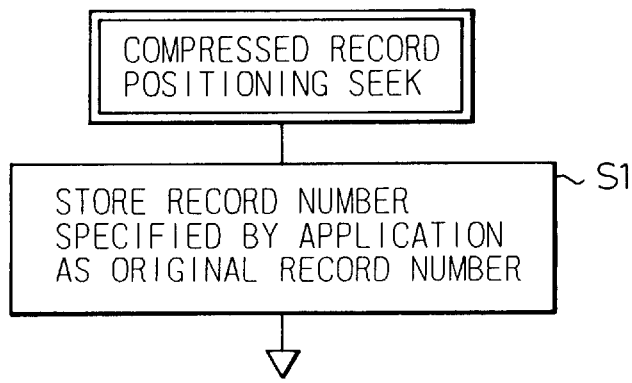
FIG. 9 is a flowchart illustrating a compressed file positioning seek process.

FIG. 9 shows a flowchart for the compressed record positioning seek process. In FIG. 9, when the compressed record positioning seek process is called, in S1 the record number specified by the application program is stored as the original record number. After calling the compressed record positioning seek process, if the compressed file read process (FIG. 6) or the compressed file write operation (FIG. 7) is called, random access to the desired record is achieved. If the compressed file read process or the compressed file write process is successively called without calling the compressed record positioning seek process, sequential access is achieved.

As described above, when the file structure by the LFS is adopted, compressed data read/write operations are relatively simple. However, if new data is more compressed than old data as a compressed file is updated, the freed clusters are left unused in the compressed code area, and it is difficult to reflect the reduction in the required space resulting from compressed file updates by squeezing the compressed code area. Furthermore, as files are updated, original records clusters become fragmented, which can eventually lead to a decrease in the speed of disk access. This problem can be addressed by routinely aggregating free clusters as compressed files are updated several times, and by performing a cleaning operation to resequence the compressed clusters of the original records in contiguous fashion.

Figure 10:
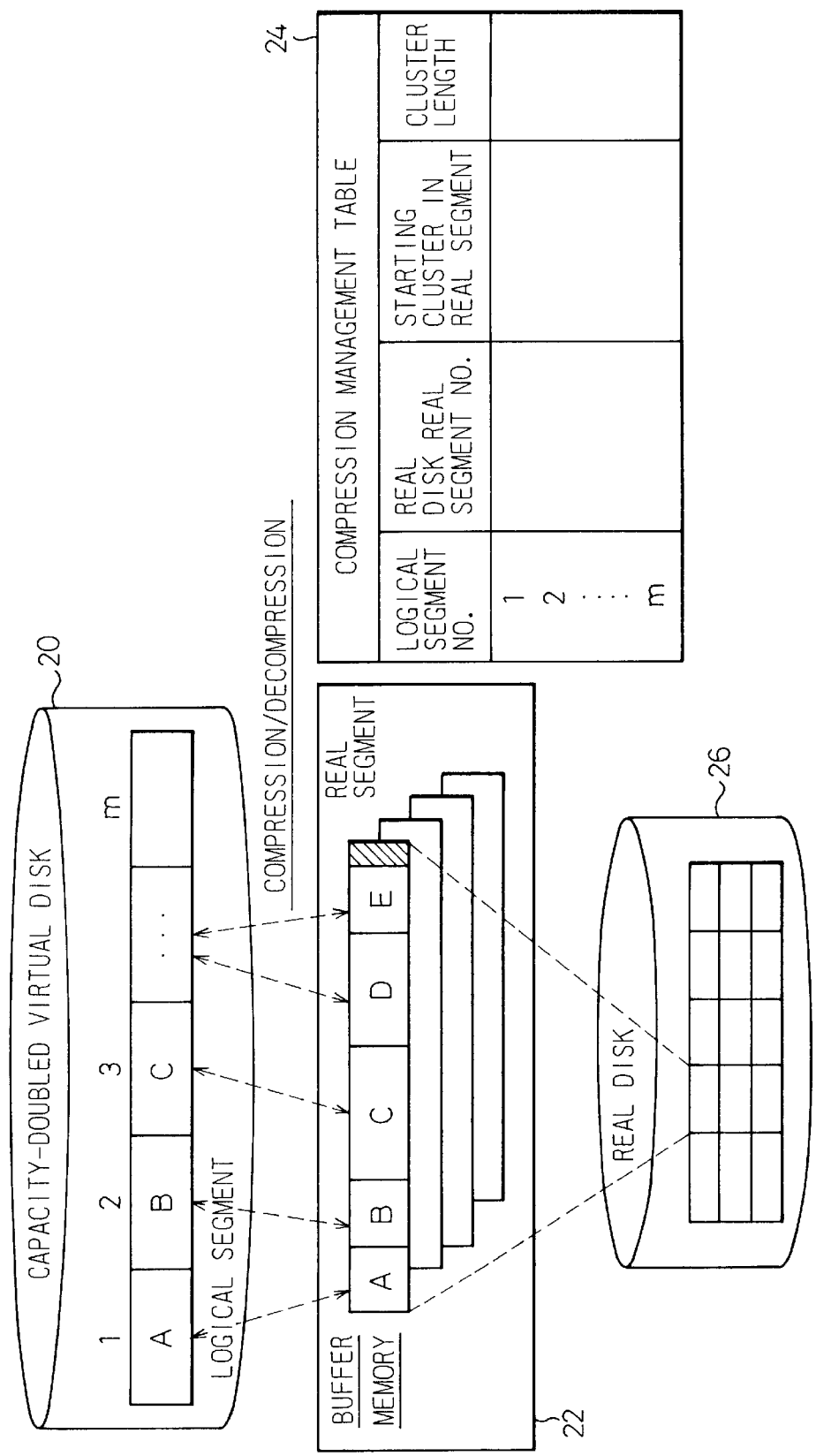
FIG. 10 is a diagram for explaining the PFS method.

We will next describe an embodiment in which the previously described PFS is applied to the compressed file structure. Before proceeding to the description of the present invention, we will first explain the PFS method. FIG. 10 is a diagram for explaining file compression by the PFS method. In the figure, reference numeral 20 is a capacity-doubled virtual disk, 22 is a buffer memory, 24 is a compression management table, and 26 is a real disk. As shown, the PFS method first assumes a virtual disk 20 whose storage capacity is doubled by compression. The buffer memory 22 holds a plurality of segments (real segments). Each of the real segments has a size two to four times that of a logical segment. Each real segment is used to hold compressed data of a plurality of logical segments.

When a read occurs for a logical segment on the virtual disk, a real segment holding the corresponding compressed data is read from the real disk 26, and the compressed data is decompressed for output. When writing a logical segment on the virtual disk, the logical segment is compressed and stored in a free area on one of the plurality of real segments in the buffer memory. If a sufficiently large free area is not available in the buffer memory, a real segment having the smallest free area is written onto the disk, to create an empty real segment in the buffer memory, and the compressed data is written to the empty real segment. That is, compressed data of logical segments are packed into free areas on the plurality of real segments, and the packing of the free area is optimized for each of the plurality of real segments. The compression management table 24 is a mapping table of the logical segments into real segments. The compression management table stores information about each real segment containing logical segments, the positions of clusters stored in each real segment, the length of each compressed cluster, etc.

Figure 11:
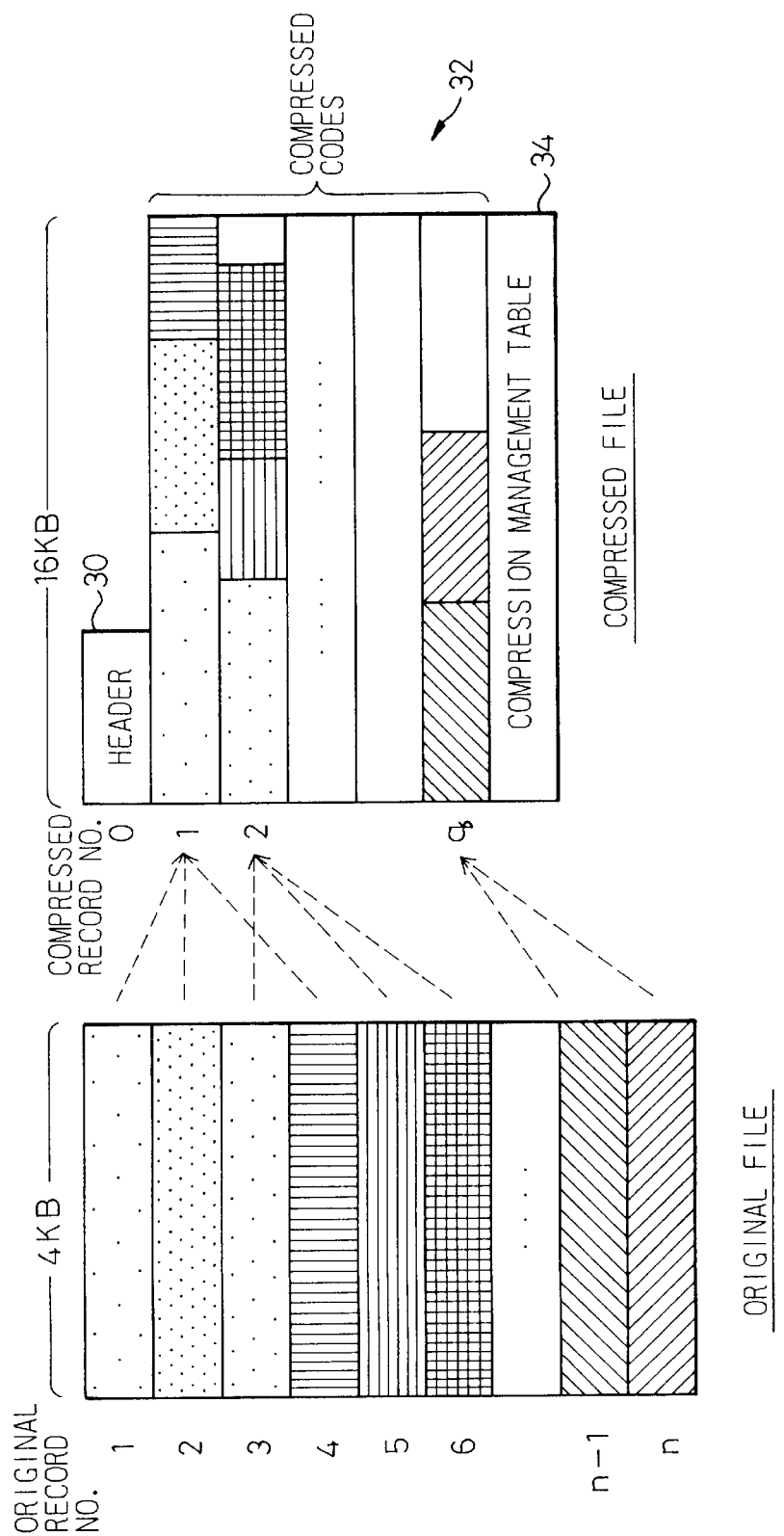
FIG. 11 is a diagram for explaining one embodiment of the present invention in which the PFS method is adopted.

FIG. 11 is a diagram showing the embodiment in which the PFS method is applied to the compressed file structure. The present embodiment will be described, dealing with an example in which the original record size is 4 KB and the compressed record size is 16 KB, as shown in the figure.

As shown, a compressed file consists of three areas, i.e., a header 30, compressed codes 32 of original records, and a compression management table 34. The header 30 contains information such as the original record length, the number of original records, and the number of compressed records.

Figures 12, 13:
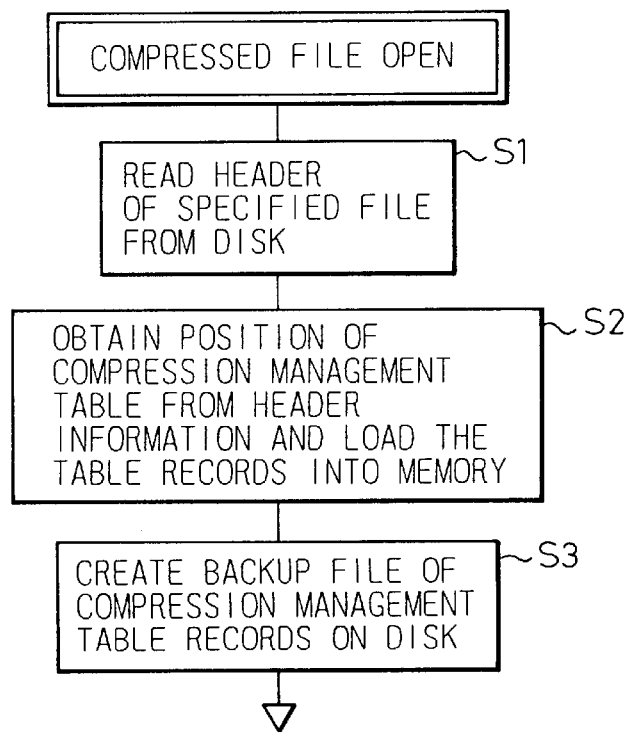
FIG. 12 is a diagram for explaining the compression management table shown in FIG. 11.
FIG. 13 is a flowchart illustrating a compressed file open process according to the embodiment of FIG. 11.

FIG. 12 shows the contents of the compression management table. The compression management table 34 is used to search for a stored compressed record number, the starting cluster within a compressed record, and the cluster length by using the original record number. Here, the original records correspond to the logical segments in FIG. 10, and the compressed records correspond to the real segments in FIG. 10. Each compressed code is expressed using one to four clusters; in the case of a compressed code requiring four clusters for storage, raw data is stored.

FIGS. 13 to 16 are flowcharts illustrating input/output operations performed on a compressed file to which the concept of the PFS method is applied. It is desirable to design the program so that the compressed file open, read, write, seek, and close processes will be called from the input/output functions described with reference to FIG. 1 or 2.

When the compressed file open process is called, in S1 the header of the specified compressed file is read from the disk. Next, in S2, the storage position of the compression management table in the compressed data is obtained from the information carried in the header, and the table is loaded into memory. Then, in S3, a backup file of the compression management table is created on the disk. This is done to provide for an unexpected accident during file updating, as in the case of the LFS method.

Figure 14:
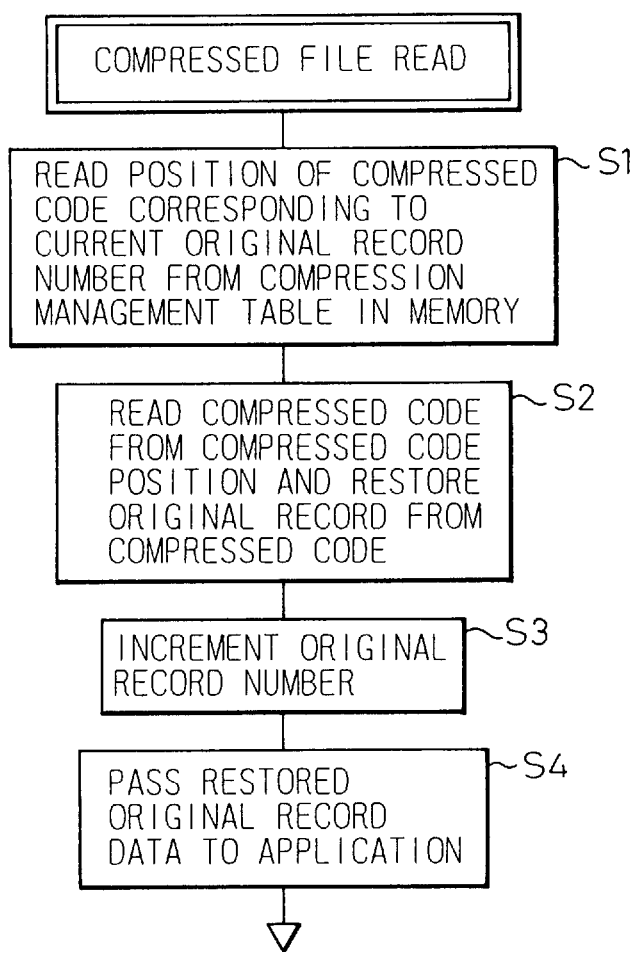
FIG. 14 is a flowchart illustrating a compressed file read process according to the embodiment of FIG. 11.

FIG. 14 is a flowchart illustrating the compressed file read process according to the present embodiment. When the compressed file read process is called, in S1 the start position of the compressed code corresponding to the current original record number is read from the compression management table loaded in memory. Next, in S2, the compressed code of the original record is read from the thus readout start position of the compressed code, and the original data is restored from the compressed code. Next, in S3, the original record number is incremented by 1. Then, the original record thus restored is passed to the host application program, upon which the process is terminated.

Figure 15:
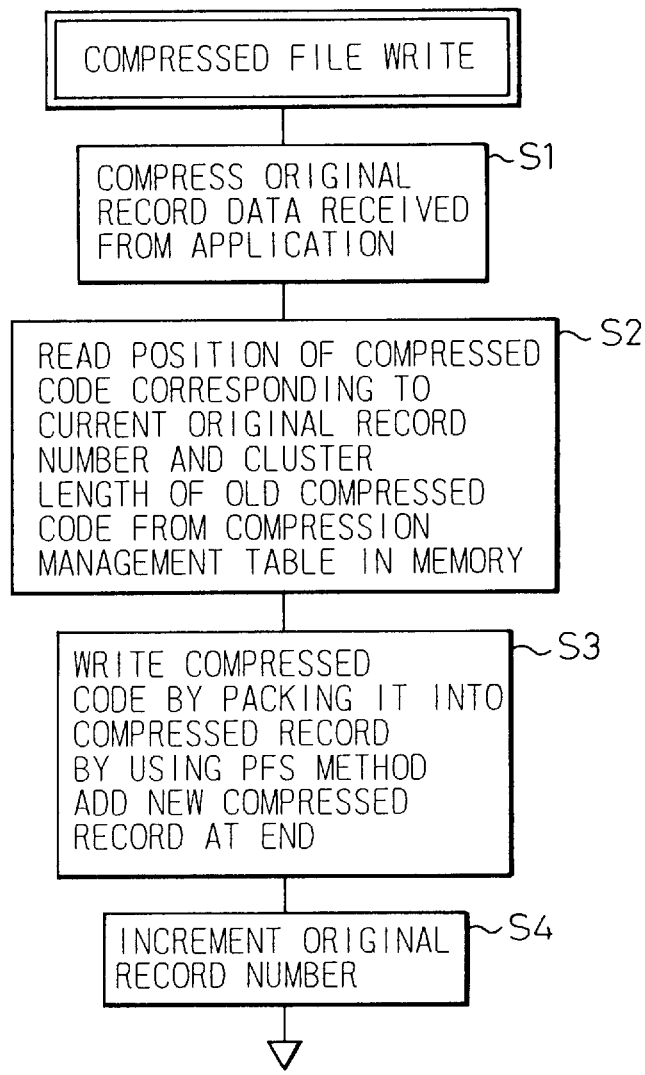
FIG. 15 is a flowchart illustrating a compressed file write process according to the embodiment of FIG. 11.

FIG. 15 is a flowchart showing the compressed file write process according to the present embodiment. When the compressed file write process is called, in S1, the original record data received from the host application program is compressed. Then, in S2, the compressed code position corresponding to the current original record number and the cluster length of the compressed code are read from the compressed cluster start position table in the compression management table loaded in memory. Next, in S3, the compressed code is written by packing it into a compressed record by using the PFS method. If a new compressed record is needed, a new compressed record is created at the end of the compressed code area. Then, in S4, the original record number is incremented by 1, after which the process is terminated. In this way, when the compressed file write process is called next time, the next original record is accessed, unless a compressed record positioning seek process (the same one as described in FIG. 9 can also be used here) is called.

Figure 16:
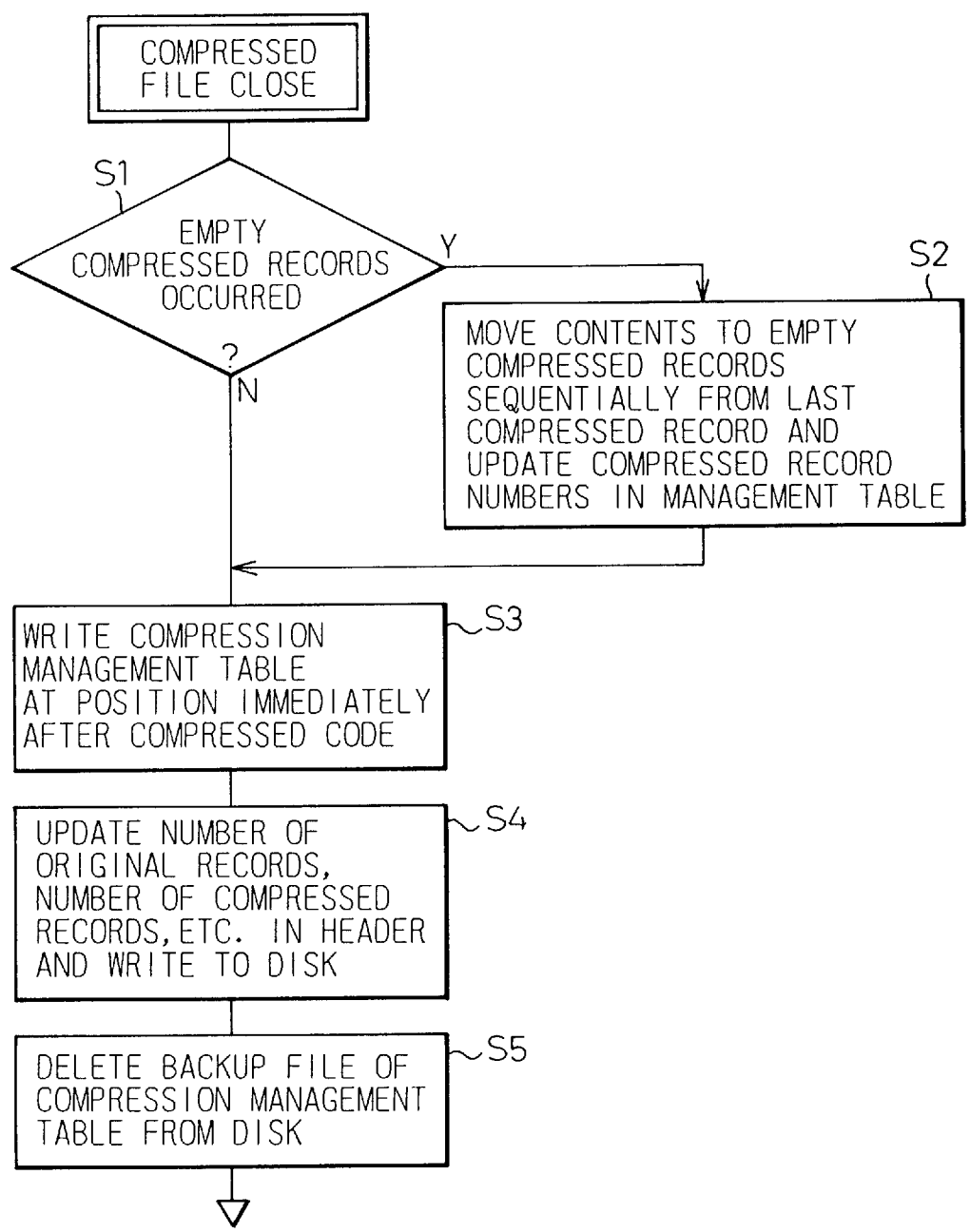
FIG. 16 is a flowchart illustrating a compressed file close process according to the embodiment of FIG. 11.

FIG. 16 is a flowchart illustrating the compressed file close process according to the present embodiment.

When the compressed file close process is called, it is determined in S1 whether there are any compressed records that have empty spaces. If there are any such compressed records, the contents of the stored compressed records are moved to the empty spaces, one after another starting from the last compressed record. Then, the corresponding record numbers in the compression management table are updated, after which the process proceeds to S3. On the other hand, if, in S1, there are no such records, the process proceeds directly to S3, where the compression management table is written at a position immediately following the last record in the compressed code area.

After S3, the process proceeds to S4, where the number of original records and the number of compressed records, carried in the header, are updated and written to the disk. Then, in S5, the backup file of the compression management table is deleted from the disk, after which the process is terminated.

As described, according to the PFS method, since compressed data of a plurality of original records are aggregated into one compressed record (real segment), the process involved is somewhat complicated, but when a compressed file is updated and the size of new data is reduced as compared to old data, the compressed code area can be reduced accordingly by packing the data contiguously. Furthermore, since the compressed data of the original records are stored in contiguous clusters, this method has the advantage of improving the access speed.

So far, the storage of compressed data has been described by taking a read/write file as an example. There are other types of file; a read-only file and a read/additionally-writable file, described hereinafter, are examples of special types of file. The following description deals with examples in which the present invention is applied to these types of file. The read-only file does not allow alterations to its contents, and the read/additionally-writable file does not allow overwriting the stored data but allows the addition of new data to alter the contents. That is, in either type of file, no empty space occurs in the compressed code area, and the LFS method can therefore be adopted effectively.

Figure 17:
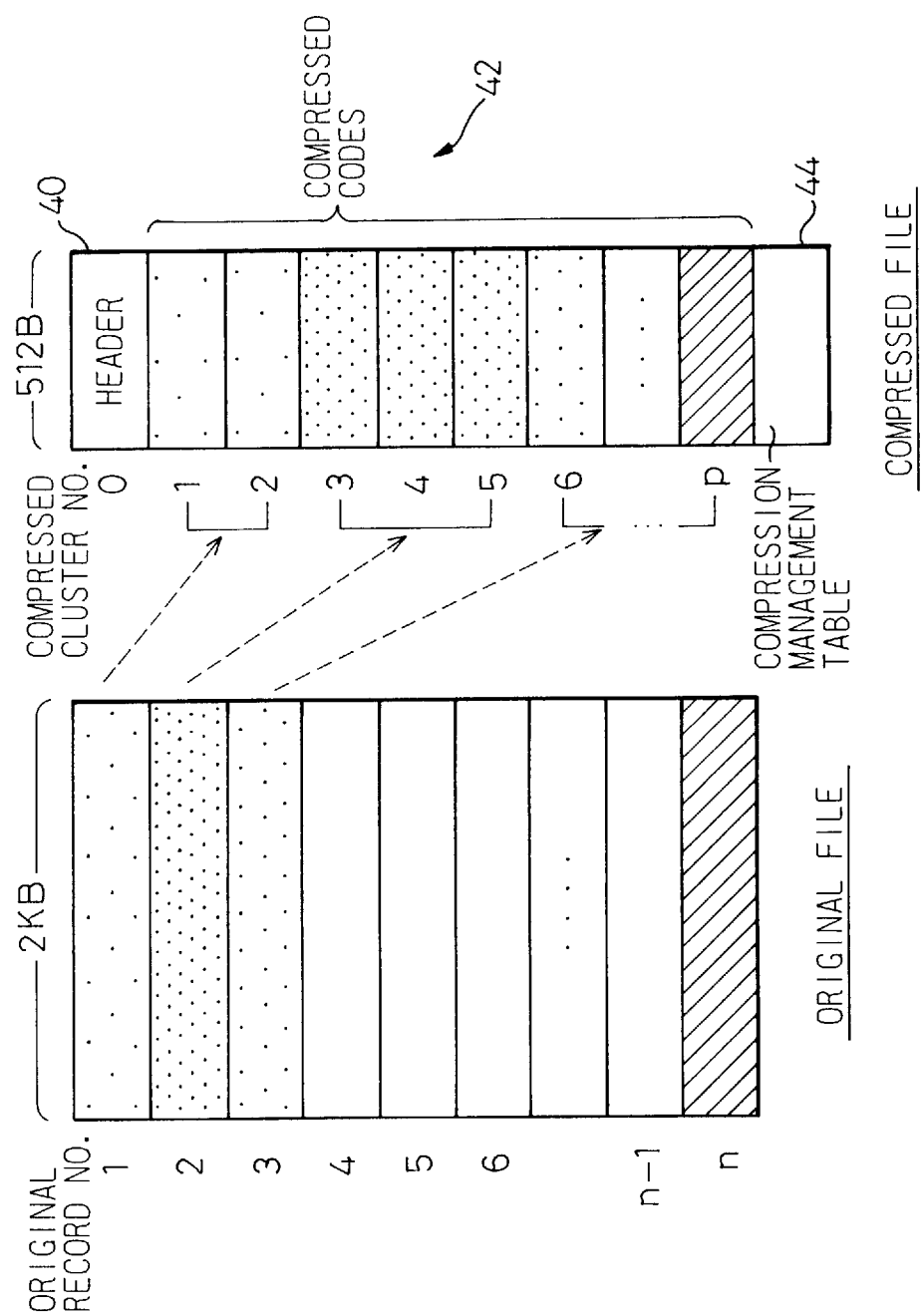
FIG. 17 is a diagram for explaining an embodiment of the present invention concerning a read-only file.

FIG. 17 is a diagram showing an embodiment concerning the storage of compressed data in a read-only file. In this embodiment, a compressed file consists of three areas, i.e., a header 40, compressed codes 42 of original records, and a compression management table 44. The compression management table 44 may be placed immediately after the header 40 since the area of the compressed codes 42 is fixed in size in the case of a read-only file. The header 40 contains information such as the original record length, the number of original records, and the number of compressed clusters, as in the case of the foregoing embodiments. The compression management table 44 contains information describing the start position of the compressed code corresponding to each original record and the cluster length of each compressed code. In this example, 2 bits are assigned to describe the cluster length, i.e., the required number of clusters, 1 to 4. When four clusters are required, raw data is stored.

Figure 18:
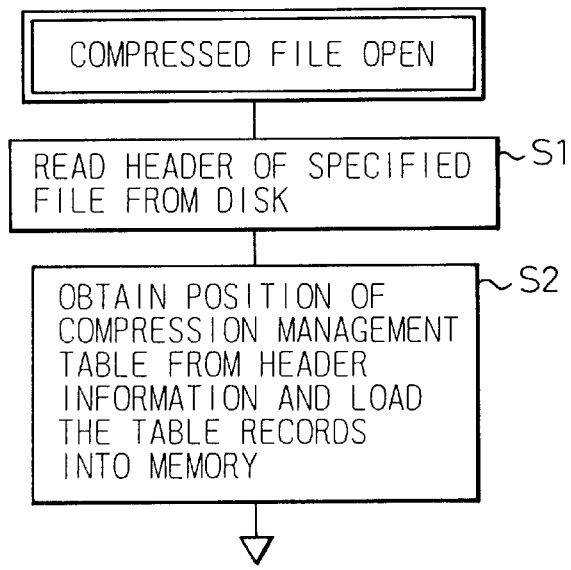
FIG. 18 is a flowchart illustrating a compressed file open process according to the embodiment of FIG. 17.
Figure 19:
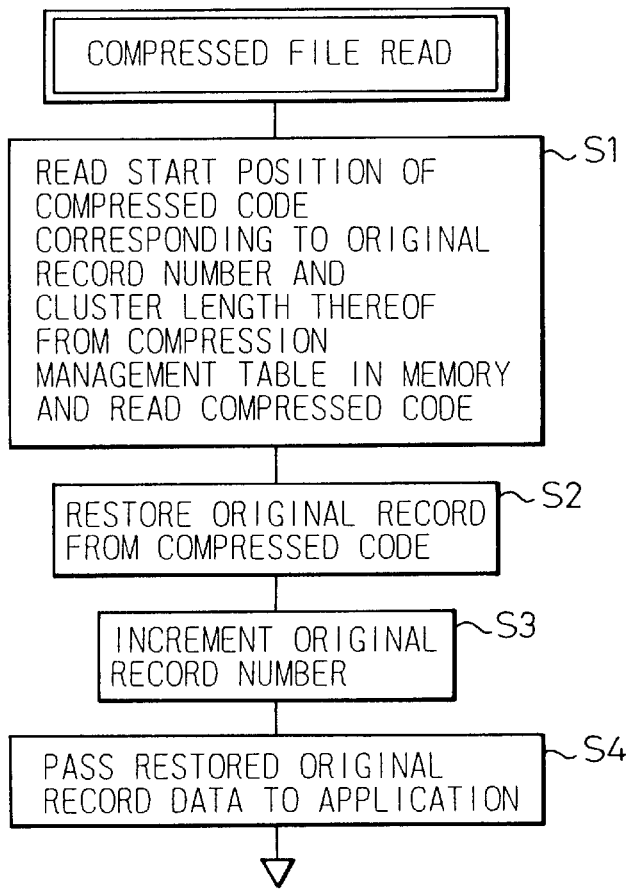
FIG. 19 is a flowchart illustrating a compressed file read process according to the embodiment of FIG. 17.

FIGS. 18 and 19 are flowcharts illustrating the compressed file open and read processes according to the present embodiment.

The compressed file open process according to the present embodiment will be described below with reference to FIG. 18. When the compressed file open process is called, first, in S1, the header of the compressed file corresponding to the specified file is read. Next, in S2, the original record length and the number of original records, carried in the header, are read out; then, the storage position of the compression management table in the compressed file is determined based on the thus readout data, and the compression management table is loaded into memory. In the case of a read-only file, a backup file is not specifically created since no rewriting occurs to the data on the disk.

Next, the compressed file read process will be described with reference to FIG. 19. When the compressed file read process is called, first, in S1, the cluster start position of the compressed code corresponding to the current original record number and the cluster length of the compressed code are read from the compressed management table in memory, and the compressed code corresponding to the original record is read out. Then, in S2, the original record is restored from the compressed code of the original record. Next, in S3, the original record number is incremented by 1. Then, the restored original record data is passed to the host application program, upon which the process is terminated.

Figure 20:
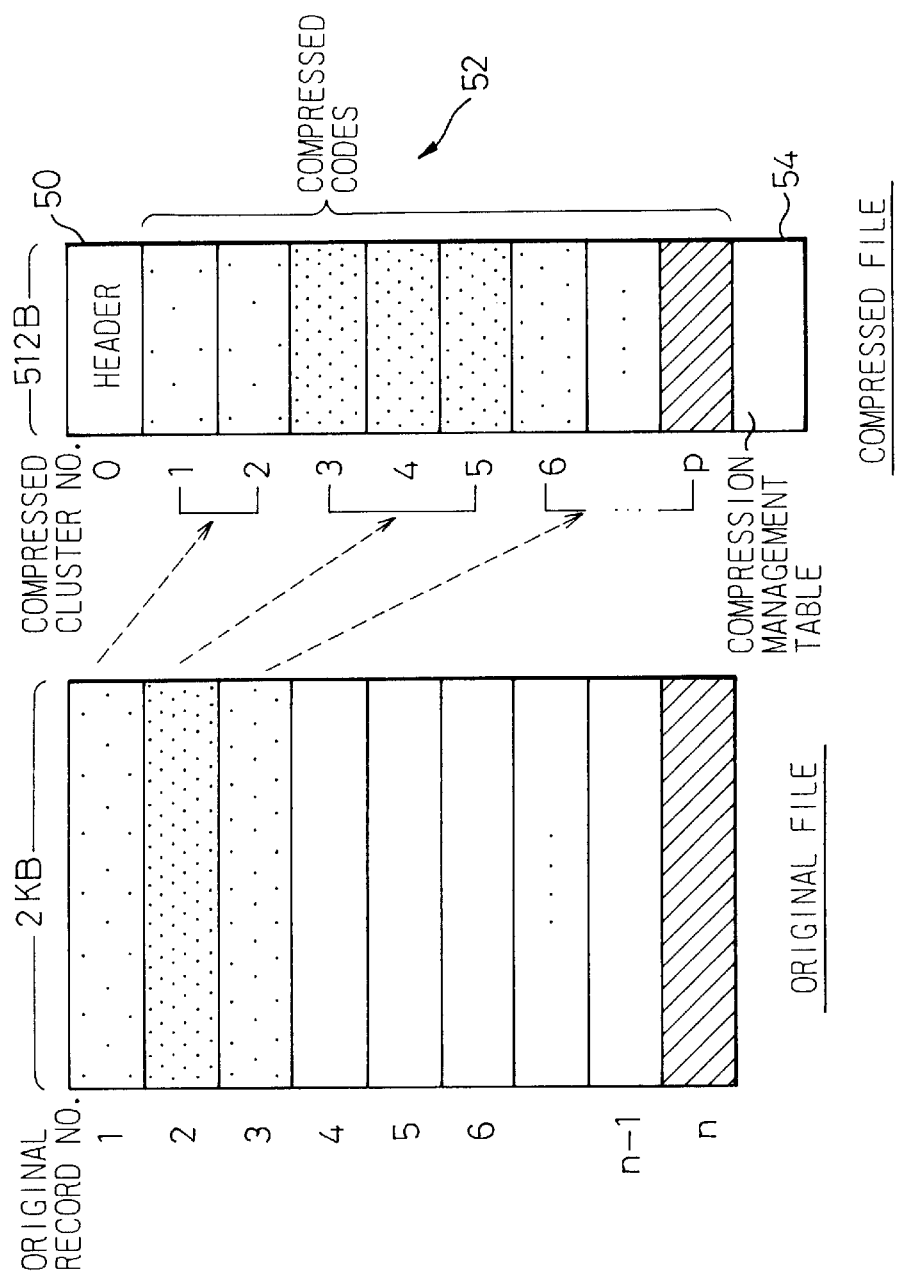
FIG. 20 is a diagram for explaining an embodiment of the present invention concerning a read/additionally-writable file.

FIG. 20 is a diagram showing the storage of compressed data in a read/additionally-writable file. In this embodiment, a compressed file consists of three areas, i.e., a header 50, compressed codes 52 of original records, and a compression management table 54, as in the case of an ordinary read/write file. The header contains information such as the original record length, the number of original records, the last update record number, and the number of compressed clusters, of which the last update record number will be described in detail later. The compression management table 54 stores the compressed code start position, cluster length, and update information (to be described later) for each original record number. The compressed file is changed when a new original record is added or when an already stored original record is updated.

To add and store new original records, a plurality of record numbers are reserved by assuming the number of new records to be added, and these record numbers are assigned to newly added records. The record numbers for added records are allocated immediately following the already stored original record numbers.

On the other hand, when updating already stored records, numbers following the record numbers reserved for additional records are allocated as update record numbers. Therefore, larger numbers than the original record numbers, including the record numbers for additional records, are given as update record numbers used when updating records. The update record numbers thus given are written to the update information in the compression management table. Therefore, when an access is made to an original record, if the original record is updated, a chain is traced starting with the original record number until it reaches the corresponding update record number, thus obtaining the position of the compressed code corresponding to the latest version of the original record data. The compressed code corresponding to the latest version of the original record can be identified by writing, for example, a 0 to the update information. Since a full history of updates is maintained, record data at any point in time can be referenced.

Figure 21:
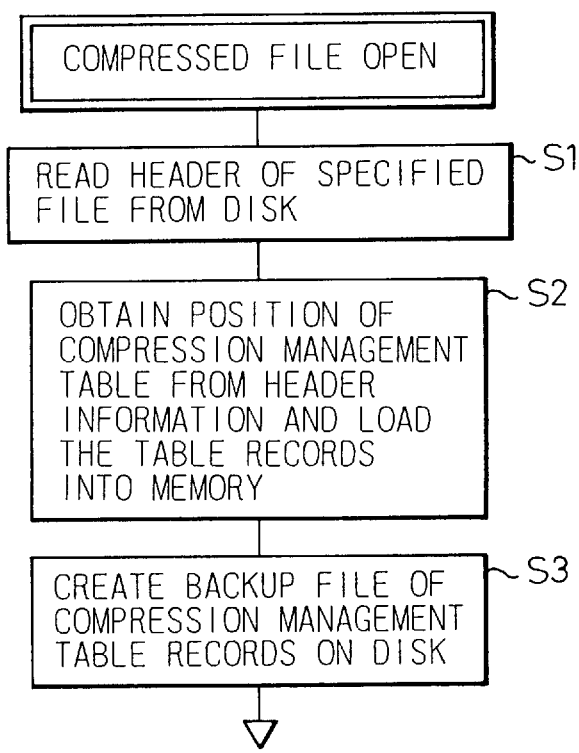
FIG. 21 is a flowchart illustrating a compressed file open process according to the embodiment of FIG. 20.

FIGS. 21 to 24 are flowcharts illustrating procedures for performing compressed data management on a read/additionally-writable compressed file by using the LFS method. FIG. 21 illustrates a compressed file open process, FIG. 22 a compressed file read process, FIG. 23 a compressed file write process, and FIG. 24 a compressed file close process.

The compressed file open process will be described below with reference to FIG. 21. When the compressed file open process is called, first in S1 the header of the compressed file corresponding to the specified file is read out. Next, in S2, the record length and the number of original records in the original file, carried in the header, are read out; then, based on these data, the storage position of the compression management table in the compressed file is obtained, and the compression management table is loaded into memory. Next, in S3, a backup file of the compression management table is created on the disk, after which the process is terminated.

Figure 22:
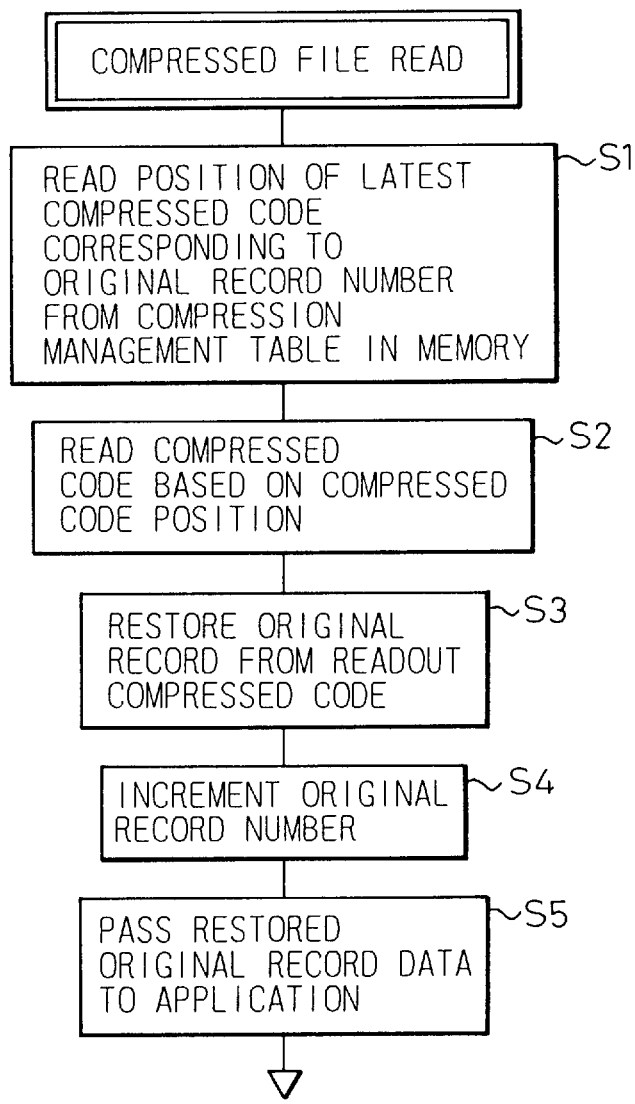
FIG. 22 is a flowchart illustrating a compressed file read process according to the embodiment of FIG. 20.

The compressed file read process will be described next with reference to FIG. 22. When the compressed file read process is called, first in S1 the start position of the latest compressed code corresponding to the original record number and the cluster length of the compressed code are read from the compression management table loaded in memory. Then, the compressed code is read out onto the disk from the compressed code start position thus read out. Here, by referring to the compression management table on the basis of the original record number, the position of the compressed code before update or not updated can be obtained. If data in the original record is updated, the compression management table is sequentially referred to for update record numbers as update information, thereby retrieving the start position of the latest compressed code and the cluster length thereof. Next, in S2, the compressed code is read out, and in S3, the original record is restored from the readout compressed code. In S4, the original record number is incremented by 1. In this way, when the compressed file read process is called next time, the next original record is accessed, unless a compressed record locating seek process (the same one as that shown in FIG. 9 can also be used here) is called. Then, in S4, the restored original record data is passed to the host application program, upon which the process is terminated.

Figure 23:
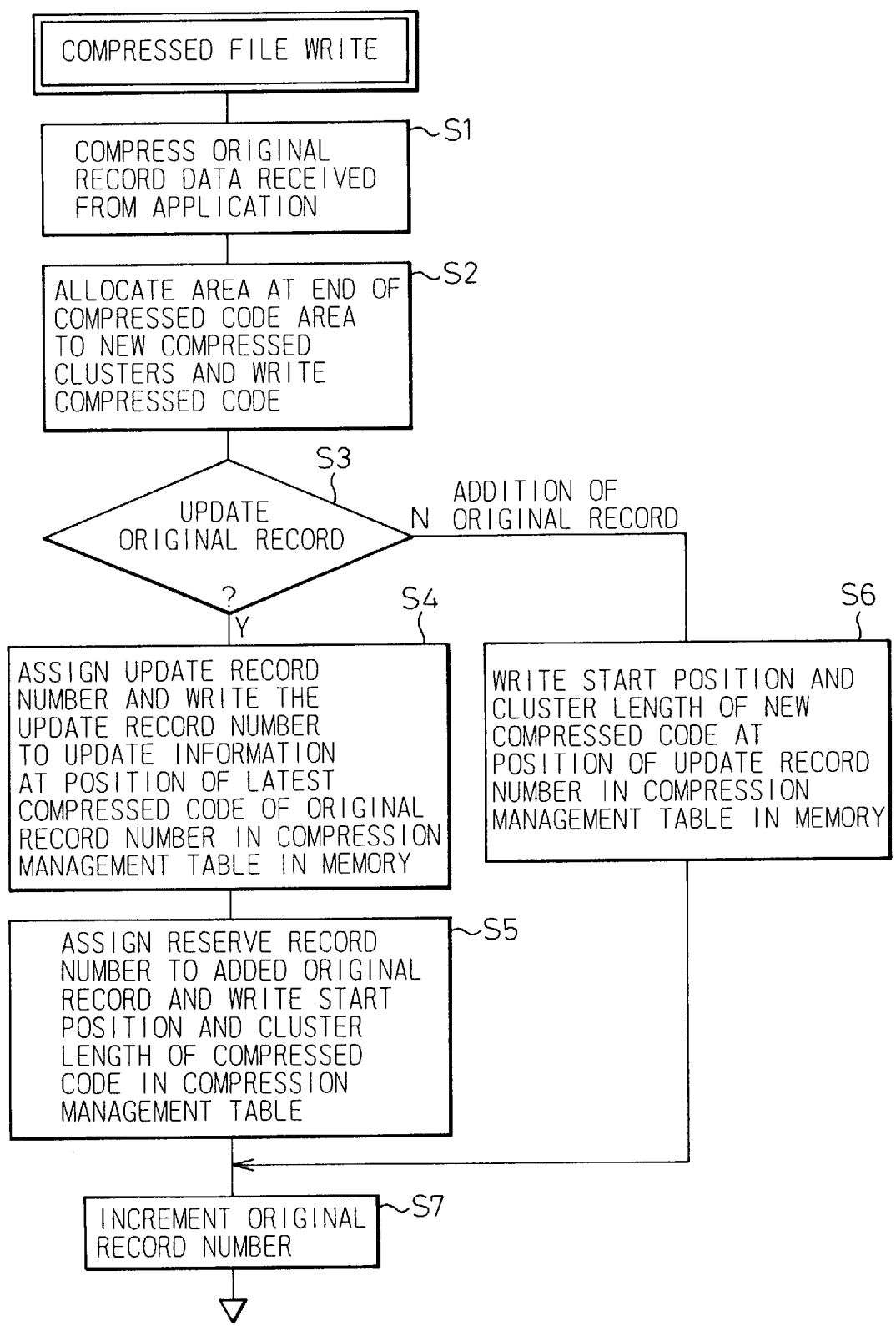
FIG. 23 is a flowchart illustrating a compressed file write process according to the embodiment of FIG. 20.

The compressed file write process will now be described below with reference to FIG. 23. When the compressed file write process is called, first in S1 the original record data received from the host application program is compressed. Next, new clusters for storing the compressed original record data are allocated following the compressed code area, and the compressed code is written to the disk. Next, in S3, it is determined whether the original record is for updating already stored data. If it is for updating already stored data, then in S4 an update record number is assigned to the compressed code, and the thus assigned update record number is written as the latest update information of the compressed code for the original record number in the compression management table in memory. Then, in S5, the start position of the compressed code and the cluster length thereof are written at the position of the new update record number in the compression management table in memory. In this case, the update information is set to 0, indicating the latest data.

On the other hand, if it is determined in S3 that the record is not for updating already stored data, then this means a newly added record; therefore, in S6, a record number reserved for an additional record is assigned to that record, and the compressed code start position and cluster length are written at the position of the newly added record in the compression management table. Then, in S7, the original record number is incremented by 1, after which the process is terminated.

Figure 24:
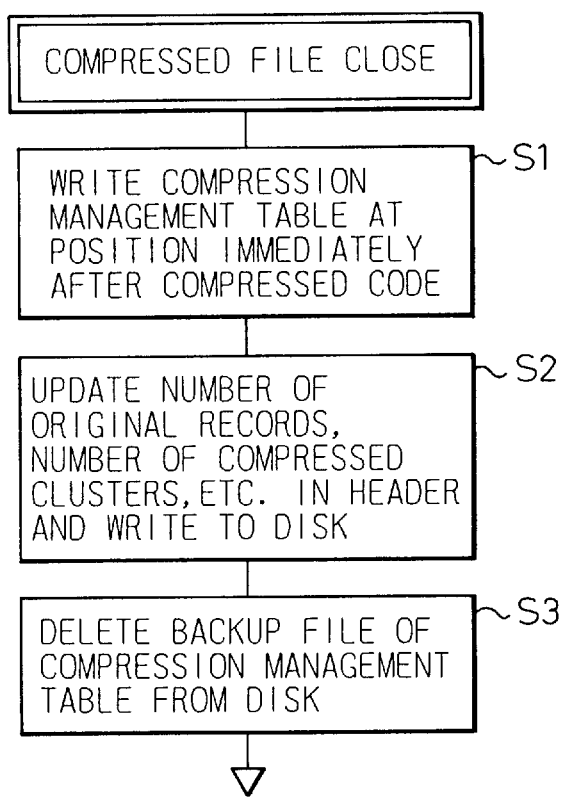
FIG. 24 is a flowchart illustrating a compressed file close process according to the embodiment of FIG. 20.

FIG. 24 is a flowchart illustrating the compressed file close process. When the compressed file close process is called, first, in S1, the compression management table is written to the disk immediately following the last record in the compressed code area. Next, in S2, the number of original records and the number of compressed clusters, carried in the header, are updated and written to the disk, after which, in S3, the backup file of the compression management table is deleted from the disk to complete the process.

In any of the above embodiments, the file size that can be handled is limited by the number of bits used to indicate the start position of the compressed code of each record, but it will be recognized that a larger file size can be handled by increasing the number of bits.

As described above, according to the present invention, the overhead processing time necessary for performing file compression and decompression in cluster increments can be shortened while allowing the storage of normal files and compressed files on the same storage medium and without making the user aware of the file compression. Also, the type of medium for storing compressed files is not limited to any one particular type. Furthermore, by managing the compression management information on a file-by-file basis, damage due to a failure, etc. can be limited only to the file being accessed; this improves reliability.

We claim:

1. A method of reading an original record stored as compressed data thereof, comprising the steps of:
   (a) determining a storage location of the compressed data in a file organized by an operating system, by referring to a compression management table which is stored in the file together with the compressed data and which keeps storage locations of the compressed data of individual original records, in the file; and
   (b) restoring the original record from the compressed data whose storage location is determined in step (a).

2. A method according to claim 1, further comprising the steps of
   judging whether the file is a compressed file subjected to compression or a normal file not subjected to compression, and
   performing steps (a) and (b) only when it is judged that the file is the compressed file.

3. A method according to claim 1, wherein the compressed data of each original record are divided into one or more clusters for storage.

4. A method according to claim 3, wherein the compression management table includes a compressed cluster start position table for recording the storage location of a cluster holding the beginning of the compressed data of each original record, and includes a compressed cluster chain for recording a storage location of a subsequent cluster with regard to each cluster.

5. A method according to claim 3, wherein
   the file is a read-only file, and
   the compression management table holds information on the storage location of a cluster holding the beginning of compressed data of each original record, and on the number of the clusters.

6. A method according to claim 3, wherein
   the file is a read/additionally-writable file, and
   the compression management table holds information, for each original record number, on the storage location of the original record and an original record number assigned to the original record after updating.

7. A method according to claim 1, wherein compressed data of one or more original records is packed into a compressed record.

8. A method according to claim 7, wherein the compression management table holds information on the storage location of a compressed record in which compressed data of each original record is packed and on the location of the compressed data in the compressed record.

9. A method according to claim 1, wherein
   the compression management table is stored in said file at a position following the compressed data, and
   the file contains at the beginning thereof a header that carries information used to determine the position of the compression management table.

10. A method according to claim 9, further comprising the steps of
    (c) determining, based on the information contained in the header, the position in the file at which the compression management table is stored, and
    (d) loading the compression management table, whose storage position is determined in step (c), from the file into a memory so that the compression management table may be referred to in step (a).

11. A method of writing an original record as compression data thereof, comprising the steps of:
    (a) compressing the original record and thereby generating the compressed data; and
    (b) storing the compressed data generated in step (a) into a file organized by an operating system, the file containing compressed data of individual original records and a compression management table that keeps storage locations of compressed data of the individual original records, in the file.

12. A method according to claim 11, further comprising the steps of
    judging whether the file is a compressed file subjected to compression or a normal file not subjected to compression, and
    performing steps (a) and (b) only when it is judged that the file is the compressed file.

13. A method according to claim 11, wherein the compressed data of each original record are divided into one or more clusters for storage.

14. A method according to claim 13, wherein the compression management table includes a compressed cluster start position table for recording the storage location of a cluster holding the beginning of the compressed data of each original record, and includes a compressed cluster chain for recording the storage location of a subsequent cluster with regard to each cluster.

15. A method according to claim 13, wherein
    the file is a read/additionally-writable file, and
    the compression management table holds information, for each original record number, on the storage location of the original record and an original record number assigned to the original record after updating.

16. A method according to claim 11, wherein compressed data of one or more original records is packed into a compressed record.

17. A method according to claim 16, wherein the compression management table holds information on the storage location of a compressed record in which compressed data of each original record is packed and on the location of the compressed data in the compressed record.

18. A method according to claim 11, wherein
    the compression management table is stored in the file at a position following the compressed data, and
    the file contains at the beginning thereof a header that carries information used to determine the position of the compression management table.

19. A compressed data storage device comprising:
    means for determining a storage of compressed data of an original record, in a file organized by an operating system, by referring to a compression management table which is stored in the file together with the compressed data and which keeps storage locations of the compressed data of individual original records, in the file; and
    means for restoring the original record from the compressed data whose storage location is determined by said determining means.

20. A device according to claim 19, further comprising
    means for judging whether the file is a compressed file subjected to compression or a normal file not subjected to compression, and
    means for activating the determining means and said restoring means only when it is judged that the file is a compressed file.

21. A device according to claim 19, wherein the compressed data of each original record are divided into one or more clusters for storage.

22. A device according to claim 21, wherein the compression management table includes a compressed cluster start position table for recording the storage location of a cluster holding the beginning of the compressed data of each original record, and includes a compressed cluster chain for recording a storage location of a subsequent cluster with regard to each cluster.

23. A device according to claim 21, wherein the file is a read-only file, and the compression management table holds information on the storage location of a cluster holding the beginning of compressed data of each original record, and on the number of the clusters.

24. A device according to claim 21, wherein the file is a read/additionally-writable file, and the compression management table holds information, for each original record number, on the storage location of the original record and an original record number assigned to the original record after updating.

25. A device according to claim 19, wherein compressed data of one or more original records is packed into a compressed record.

26. A device according to claim 25, wherein the compression management table holds information on the storage location of a compressed record in which compressed data of each original record is packed and on the location of the compressed data in the compressed record.

27. A device according to claim 19, wherein the compression management table is stored in said file at a position following the compressed data, and the file contains, at the beginning thereof, a header that carries information used to determine the position of the compression management table.

28. A device according to claim 27, further comprising second means for determining, based on the information contained in the header, the position in the file at which the compression management table is stored, and means for loading the compression management table, whose storage position is determined by said second determining means, from the file into a memory so that the compression management table may be referred to by said first determining means.

29. A compressed data storage device comprising:

means for compressing an original record and thereby generating compressed data of the original record; and means for storing the compressed data generated by said compressing means into a file organized by an operating system, the file containing compressed data of individual original records and a compression management table that keeps storage locations of compressed data of the individual original records, in the file.

30. A device according to claim 29, further comprising means for judging whether the file is a compressed file subjected to compression or a normal file not subjected to compression, and means for activating said compressing means and said storing means only when it is judged that said file is a compressed file.

31. A device according to claim 29, wherein the compressed data of each original record are divided into one or more clusters for storage.

32. A device according to claim 31, wherein the compression management table includes a compressed cluster start position table for recording the storage location of a cluster holding the beginning of the compressed data of each original record, and includes a compressed cluster chain for recording the storage location of a subsequent cluster with regard to each cluster.

33. A device according to claim 31, wherein the file is a read/additionally-writable file, and the compression management table holds information, for each original record number, on the storage location of the original record and an original record number assigned to the original record after updating.

34. A device according to claim 29, wherein compressed data of one or more original records are packed into a compressed record.

35. A device according to claim 34, wherein the compression management table holds information on the storage location of a compressed record in which compressed data of each original record are packed and on the location of the compressed data in the compressed record.

36. A device according to claim 29, wherein the compression management table is stored in the file at a position following the compressed data, and the file contains at the beginning thereof a header that carries information used to determine the position of the compression management table.

37. A program storage device readable by a machine, tangibly embodying a program of instructions executable by the machine to perform method steps for reading an original record stored as compressed data thereof, said method steps comprising:

(a) determining a storage location of the compressed data in a file organized by an operating system, by referring to a compression management table which is stored in the file together with the compressed data and which keeps storage locations of the compressed data of individual original records, in the file; and (b) restoring the original record from the compressed data whose storage location is determined in step (a).

38. A program storage device according to claim 37, wherein said method steps further comprise judging whether the file is a compressed file subjected to compression or a normal file not subjected to compression, and performing steps (a) and (b) only when it is judged that the file is a compressed file.

39. A program storage device according to claim 37, wherein the compressed data of each original record are divided into one or more clusters for storage.

40. A program storage device according to claim 39, wherein the compression management table includes a compressed cluster start position table for recording the storage location of a cluster holding the beginning of the compressed data of each original record, and includes a compressed cluster chain for recording a storage location of a subsequent cluster with regard to each cluster.

41. A program storage device according to claim 39, wherein the file is a read-only file, and the compression management table holds information on the storage location of a cluster holding the beginning of compressed data of each original record, and on the number of the clusters.

42. A program storage device according to claim 39, wherein the file is a read/additionally-writable file, and the compression management table holds information, for each original record number, on the storage location of the original record and an original record number assigned to the original record after updating.

43. A program storage device according to claim 37, wherein compressed data of one or more original records are packed into a compressed record.

44. A program storage device according to claim 43, wherein the compression management table holds information on the storage location of a compressed record in which compressed data of each original record is packed and on the location of the compressed data in the compressed record.

45. A program storage device according to claim 37, wherein the compression management table is stored in said file at a position following the compressed data, and the file contains at the beginning thereof a header that carries information used to determine the position of the compression management table.

46. A program storage device according to claim 45, wherein said method steps further comprise (c) determining, based on the information contained in the header, the position in the file at which the compression management table is stored, and (d) loading the compression management table, whose storage position is determined in step (c), from the file into a memory so that the compression management table may be referred to in step (a).

47. A program storage device readable by a machine, tangibly embodying a program of instructions executable by the machine to perform method steps for writing an original record as compressed data thereof, said method steps comprising:

(a) compressing the original record and thereby generating the compressed data; and (b) storing the compressed data generated in step (a) into a file organized by an operating system, the file containing compressed data of individual original records and a compression management table that keeps storage location of compressed data of the individual original records, in the file.

48. A program storage device according to claim 47, wherein said method steps further comprise judging whether the file is a compressed file subjected to compression or a normal file not subjected to compression, and performing steps (a) and (b) only when it is judged that the file is the compressed file.

49. A program storage device according to claim 47, wherein the compressed data of each original record are divided into one or more clusters for storage.

50. A program storage device according to claim 49, wherein the compression management table includes a compressed cluster start position table for recording the storage location of a cluster holding the beginning of the compressed data of each original record, and includes a compressed cluster chain for recording the storage location of a subsequent cluster with regard to each cluster.

51. A program storage device according to claim 49, wherein the file is a read/additionally-writable file, and the compression management table holds information, for each original record number, on the storage location of the original record and an original record number assigned to the original record after updating.

52. A program storage device according to claim 47, wherein compressed data of one or more original records is packed into a compressed record.

53. A program storage device according to claim 51, wherein the compression management table holds information on the storage location of a compressed record in which compressed data of each original record is packed and on the location of the compressed data in the compressed record.

54. A program storage device according to claim 47, wherein the compression management table is stored in the file at a position following the compressed data, and the file contains at the beginning thereof a header that carries information used to determine the position of the compression management table.

* * * * *